US009548522B2

(12) United States Patent
Whitefield et al.

(10) Patent No.: US 9,548,522 B2
(45) Date of Patent: Jan. 17, 2017

(54) SYSTEMS, CIRCUITS AND METHODS RELATED TO LOW-LOSS BYPASS OF A RADIO-FREQUENCY FILTER OR DIPLEXER

(71) Applicant: SKYWORKS SOLUTIONS, INC., Woburn, MA (US)

(72) Inventors: David Scott Whitefield, Andover, MA (US); David Ryan Story, Holly Springs, NC (US); Nuttapong Srirattana, Billerica, MA (US); Darryl Earl Evans, Nashua, NH (US)

(73) Assignee: Skyworks Solutions, Inc., Woburn, MA (US)

( * ) Notice: Subject to any disclaimer, the term of this patent is extended or adjusted under 35 U.S.C. 154(b) by 96 days.

(21) Appl. No.: 14/088,322

(22) Filed: Nov. 22, 2013

(65) Prior Publication Data

US 2015/0145614 A1    May 28, 2015

(51) Int. Cl.
*H01P 1/10* (2006.01)
*H01P 1/15* (2006.01)
*H01P 11/00* (2006.01)
*H04B 1/00* (2006.01)
*H04B 1/44* (2006.01)
*H01P 1/20* (2006.01)
*H01P 1/213* (2006.01)
*H01P 5/12* (2006.01)

(52) U.S. Cl.
CPC . *H01P 1/15* (2013.01); *H01P 1/10* (2013.01); *H01P 11/00* (2013.01); *H04B 1/00* (2013.01); *H01P 1/20* (2013.01); *H01P 1/213* (2013.01); *H01P 5/12* (2013.01)

(58) Field of Classification Search
CPC ............... H01P 1/15; H04B 1/144; H04B 1/48

USPC .............................. 333/101, 103; 455/73, 78
See application file for complete search history.

(56) References Cited

U.S. PATENT DOCUMENTS 7,933,561 B2 *   4/2011   Sanguinetti ..................... 455/78
8,121,564 B2 *   2/2012   Behzad ........................ 455/132
(Continued)

FOREIGN PATENT DOCUMENTS

KR   10-2011-0093315 A   8/2011
KR   10-2013-0103732 A   9/2013

OTHER PUBLICATIONS

International Search Report and Written Opinion issued on Mar. 12, 2015 in connection with corresponding PCT Application No. PCT/US2014/066466.

*Primary Examiner* — Dean Takaoka
(74) *Attorney, Agent, or Firm* — Fernando Hale & Chang LLP

(57) ABSTRACT

Disclosed are systems, circuits and methods related to low-loss bypass of a radio-frequency (RF) filter or diplexer. In some embodiments, a switching network circuitry can include a first switch that has an input pole configured to receive a radio-frequency (RF) signal, a pass-through throw configured to be connectable to the input pole to allow routing of the RF signal to an RF component, and at least one dedicated bypass throw configured to be connectable to the input pole and at least one bypass conduction path. The switching network circuitry can further include a second switch that has a pole and a throw, and is connectable between an output of the RF component and the bypass conduction path. Use of the dedicated bypass throw(s) in the first switch allows implementation of low-loss bypass of the filter or diplexer.

14 Claims, 6 Drawing Sheets

(56) References Cited

U.S. PATENT DOCUMENTS

| | | |
|---|---|---|
| 8,175,541 B2 * | 5/2012 | Gorbachov ............ 455/73 |
| 8,219,157 B2 * | 7/2012 | Lum et al. ............ 455/73 |
| 2009/0133095 A1 | 5/2009 | Phillips et al. |
| 2013/0194158 A1 | 8/2013 | Chen |
| 2013/0201881 A1 | 8/2013 | Bauder et al. |

* cited by examiner

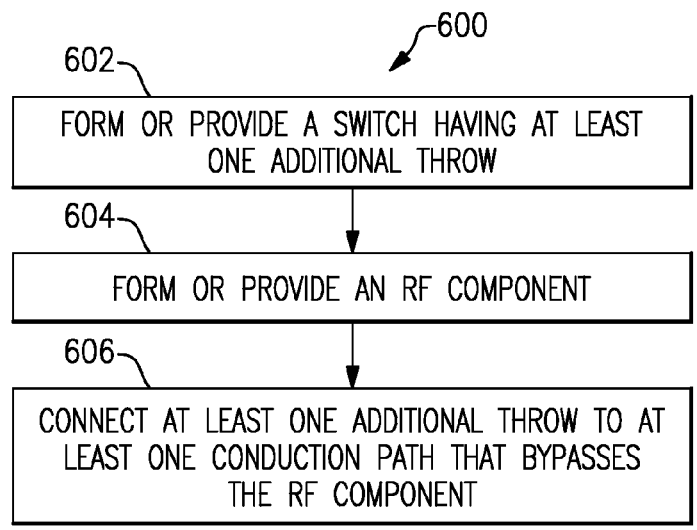
FIG.9
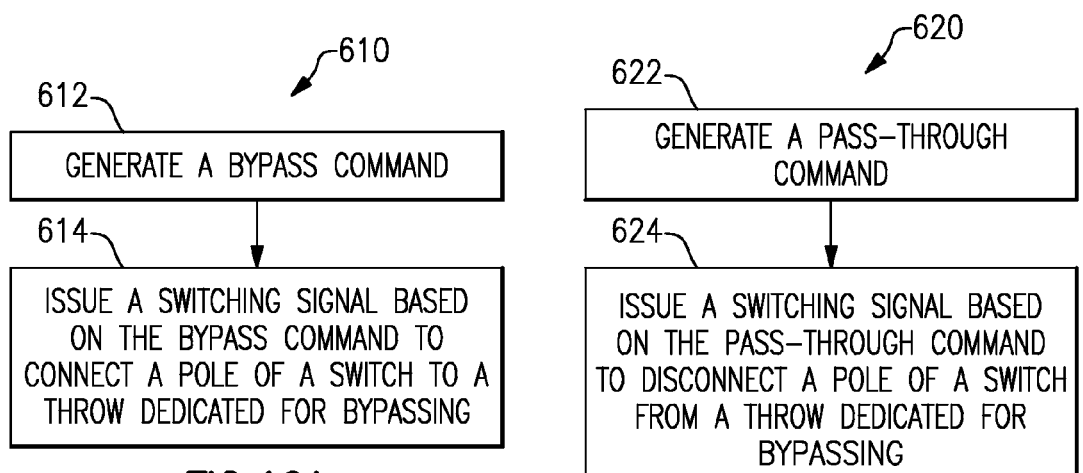
FIG.10A
FIG.10B

SYSTEMS, CIRCUITS AND METHODS RELATED TO LOW-LOSS BYPASS OF A RADIO-FREQUENCY FILTER OR DIPLEXER

BACKGROUND

Field

The present disclosure generally relates to systems and methods associated with low-loss bypass of a radio-frequency filter or diplexer.

Description of the Related Art

In a radio-frequency (RF) system, a filter or diplexer is typically needed or desired in some conditions. When not needed, it can be desirable to bypass the filter or diplexer to avoid incurring loss associated with the filter or diplexer.

SUMMARY

In accordance with a number of implementations, the present disclosure relates to a switching network circuitry that includes a first switch having an input pole configured to receive a radio-frequency (RF) signal, a pass-through throw configured to be connectable to the input pole to allow routing of the RF signal to an RF component, and at least one dedicated bypass throw configured to be connectable to the input pole and at least one bypass conduction path. The switching network circuitry further includes a second switch having a pole and a throw. The second switch is configured to be connectable between an output of the RF component and the bypass conduction path.

In some embodiments, the second switch can include at least one single-pole-single-throw (SPST) switch. The second switch can include one SPST switch for each channel of the output of the RF component. Each of the one or more SPST switches can be in an open state when the circuitry is in a bypass mode, and in a closed state when the circuitry is in a pass-through mode.

In some embodiments, the first switch can be a single-pole-multiple-throw (SPMT) switch such that the single pole is the input pole and the multiple throws include the pass-through throw and the at least one dedicated bypass throw. In some embodiments, the RF component can include a filter. In some embodiments, the at least one dedicated bypass throw can include two or more throws. In some embodiments, the RF component can include a diplexer.

In some implementations, the present disclosure relates to a semiconductor die that includes a substrate configured to receive a plurality of components. The semiconductor die further includes a switching network disposed on the substrate. The switching network includes a first switch having an input pole configured to receive a radio-frequency (RF) signal, a pass-through throw configured to be connectable to the input pole to allow routing of the RF signal to an RF component, and at least one dedicated bypass throw configured to be connectable to the input pole and at least one bypass conduction path. The switching network further includes a second switch having a pole and a throw. The second switch is configured to be connectable between an output of the RF component and the bypass conduction path.

In some embodiments, the switching network can be implemented as silicon-on-insulator (SOI) process technology. In some embodiments, the switching network can be implemented as pseudomorphic high-electron-mobility transistor (pHEMT) process technology.

In a number of implementations, the present disclosure relates to a radio-frequency (RF) module that includes a packaging substrate configured to receive a plurality of components. The RF module further includes a die mounted on the packaging substrate, with the die having a switching network that includes a first switch having an input pole configured to receive a radio-frequency (RF) signal, a pass-through throw configured to be connectable to the input pole to allow routing of the RF signal to an RF component, and at least one dedicated bypass throw configured to be connectable to the input pole and at least one bypass conduction path. The switching network further includes a second switch having a pole and a throw. The second switch is configured to be connectable between an output of the RF component and the bypass conduction path. The RF module further includes a plurality of connectors configured to provide electrical connections between the die and the packaging substrate.

In some embodiments, the die can be a silicon-on-insulator (SOI) die. In some embodiments, the die can be a pseudomorphic high-electron-mobility transistor (pHEMT) die.

According to a number of teachings, the present disclosure relates to a radio-frequency (RF) device that includes a transceiver configured to process RF signals. The RF device further includes an antenna in communication with the transceiver to facilitate transmission and reception of the RF signals. The RF device further includes a switching network implemented between the transceiver and the antennal and configured to route the RF signals. The switching network includes a first switch having an input pole configured to receive an input signal, a pass-through throw configured to be connectable to the input pole to allow routing of the input signal to an RF component, and at least one dedicated bypass throw configured to be connectable to the input pole and at least one bypass conduction path. The switching network further includes a second switch having a pole and a throw. The second switch is configured to be connectable between an output of the RF component and the bypass conduction path.

In some implementations, the present disclosure relates to a method for fabricating a device having a bypass architecture. The method includes forming or providing a switch that includes at least one throw dedicated for bypassing of a radio-frequency (RF) signal. The method further includes forming or providing an RF component. The method further includes connecting the at least one dedicated bypass throw to a corresponding conduction path that bypasses the RF component.

In some embodiments, the method can further include forming or providing a second switch at each of one or more output channels of the RF component. In some embodiments, the RF component can include a filter. In some embodiments, the RF component can include a diplexer.

According to some implementations, the present disclosure relates to a method for bypassing a radio-frequency (RF) component in a switching network. The method includes operating a first switch such that an RF signal received at an input pole of the first switch is routed to a bypass conduction path through a dedicated bypass throw. The operation of the first switch disconnects the RF component from the input pole of the first switch. The method further includes operating a second switch such that the RF component is disconnected from the bypass conduction path.

In some embodiments, the RF component can include a filter. In some embodiments, the RF component can include a diplexer.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 9 shows an example process that can be implemented to fabricate a device having a bypass architecture with one or more features described herein.

FIGS. 10A and 10B show example processes that can be implemented to enable bypass and pass-through modes.

DETAILED DESCRIPTION OF SOME EMBODIMENTS

The headings provided herein, if any, are for convenience only and do not necessarily affect the scope or meaning of the claimed invention.

Disclosed herein are systems and methods related to improving performance in bypass circuits associated with some radio-frequency (RF) components such as an RF filter or an RF diplexer. Such an improvement can include, for example, reduced loss of RF signals. Although various examples are described herein in the context of a diplexer, it will be understood that one or more features of the present disclosure can also be implemented in other applications such as a multiplexer. For the purpose of description herein, the terms diplexer and multiplexer may be used interchangeably. Accordingly, unless specifically indicated otherwise, a diplexer or a multiplexer can include two or more channels.

RF systems typically includes one or more filters and/or one or more diplexers. Such components typically are not used in all conditions. Thus, it is sometimes desirable to have RF signals bypass a filter or a diplexer when such functionality is not needed, so that extra system loss associated with the filter or diplexer can be avoided. Current architecture for achieving such a bypass typically involves adding series switch elements for performing the bypass. However, such series switching elements typically contribute to switch insertion loss.

Figure 1A:
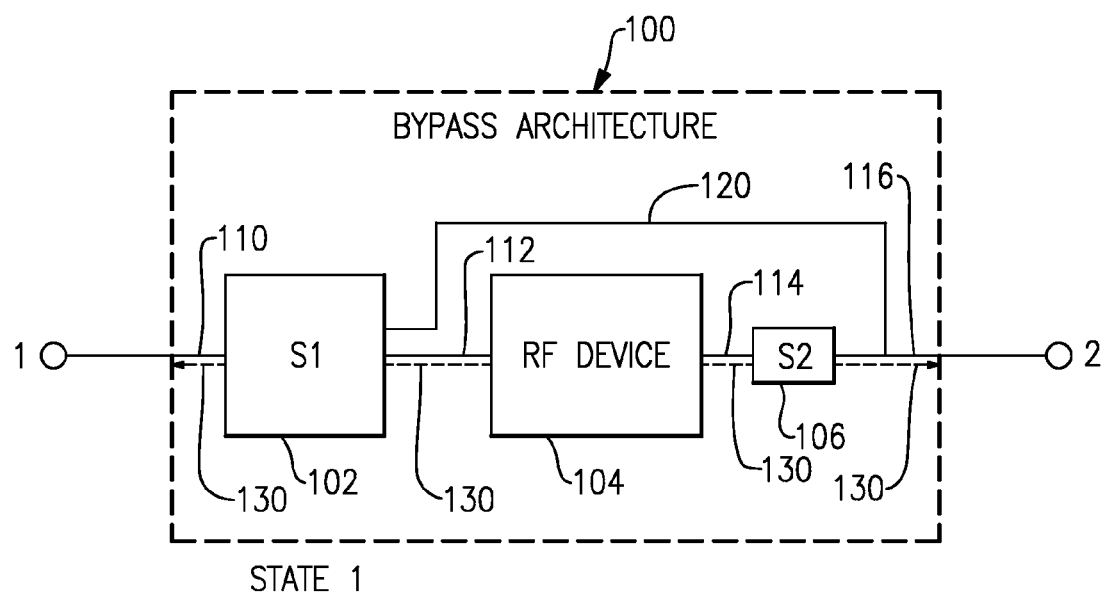
FIGS. 1A and 1B show pass-through and bypass modes of an architecture having one or more features described herein.
Figure 1B:
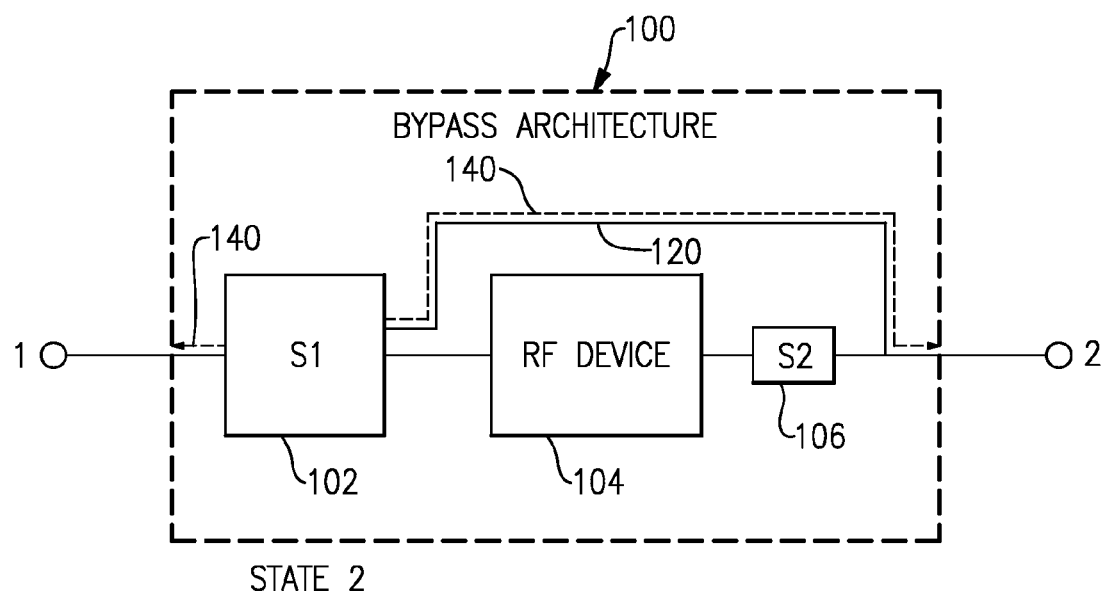

Described herein are examples of bypass configurations where advantageous features such as reduction in insertion loss can be achieved. FIGS. 1A and 1B show a bypass architecture 100 that can be configured to be in a first state (FIG. 1A) and a second state (FIG. 1B). The first state can correspond to a pass-through mode where an RF signal passes through (depicted as dotted line 130) an RF device 104 between a first node 1 and a second node 2 via conduction paths 110, 112, 114, 116. Non-limiting examples of the RF device 104 are described herein in greater detail. The second state can correspond to a bypass mode where an RF signal bypasses (depicted as dotted line 140) the RF device 104 via a conduction path 120.

In some implementations, the foregoing pass-through and bypass modes can be facilitated by a switching network that includes first and second switch circuits S1 (102) and S2 (106). In some embodiments, the first switch 102 can be an input switch for the switching network. Various non-limiting examples of the first switch 102 are described herein in greater detail. In some embodiments, the second switch 106 can be configured to provide improved isolation for each of one or more outputs of the RF device 104 when in the bypass mode. Examples of the second switch 106 are described herein in greater detail.

Figure 2A:
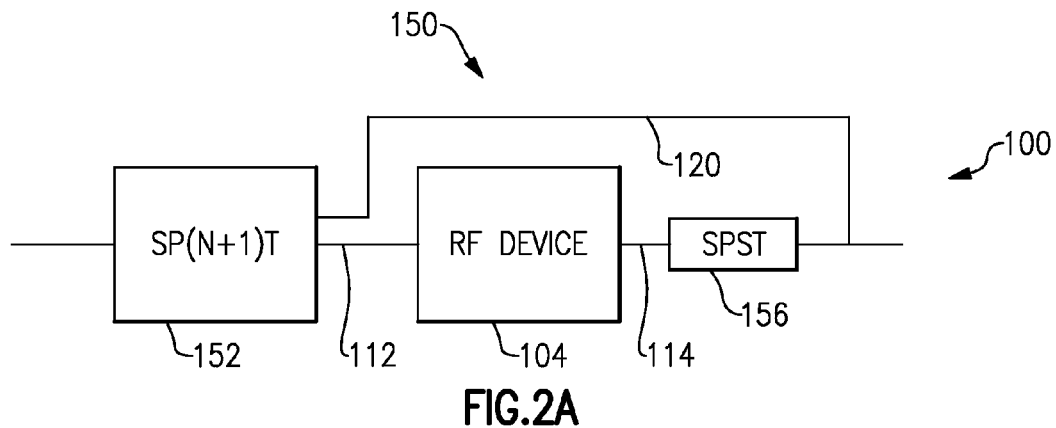
FIGS. 2A-2C show that the architecture of FIG. 1 can be implemented with a single-pole-multiple-throw (SPMT) switch to allow bypassing of one or more channels associated with an RF component.
Figure 2B:
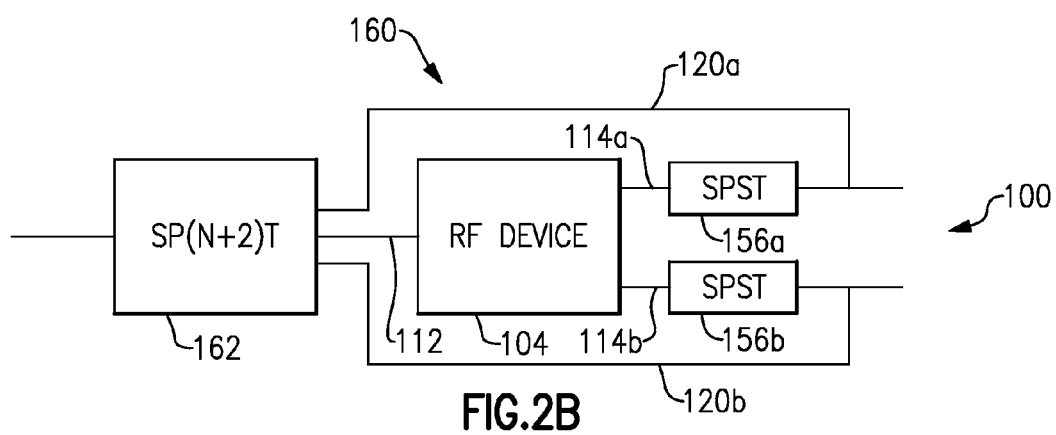
Figure 2C:
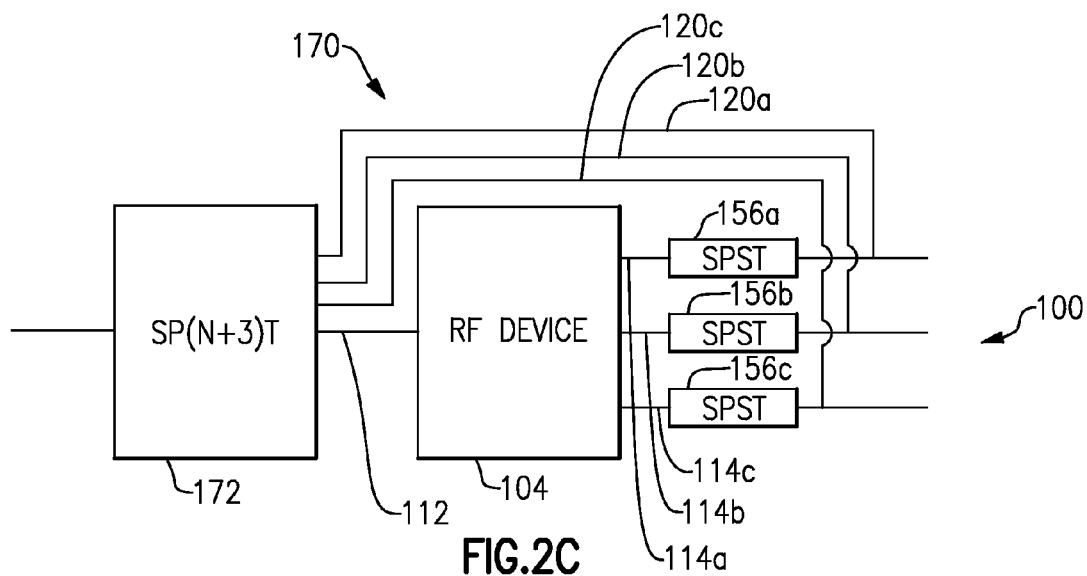

FIGS. 2A-2C show that in some implementations, the first switch 102 of the architecture 100 of FIG. 1 can be based on a single-pole-N-throw (SPNT) switch where N is a positive integer. One or more additional throws can be added to such a switch, where such added throw(s) can be dedicated for providing bypassing functionality. For example, suppose that N is 5 so that an SP5T configuration provides regular switching network functionality. Then, adding two additional throws can yield an SP7T configuration where five arms facilitate the regular switching network functionality, and two remaining arms facilitate bypass functionality for the RF device. Other values of N, as well as the number of added throw(s) are possible; and various examples are described herein.

Figure 3A:
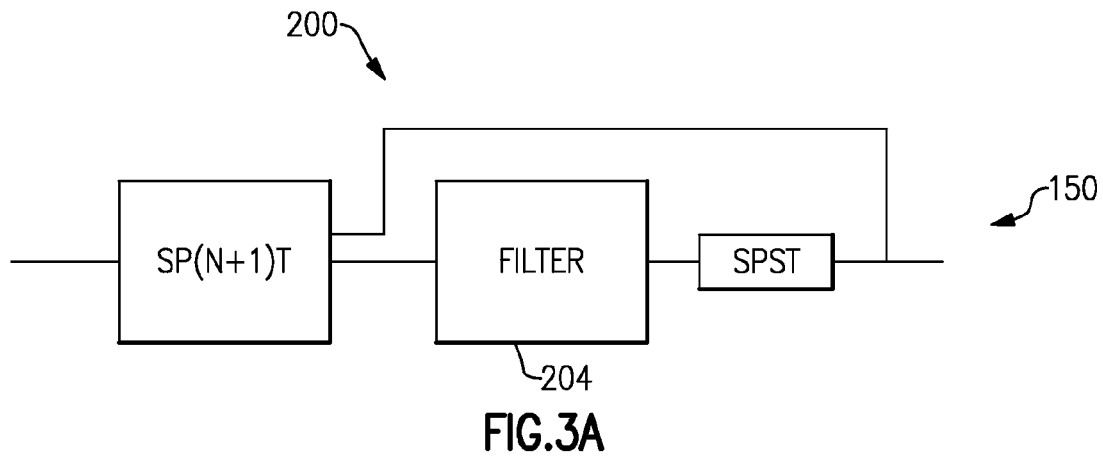
FIGS. 3A-3C show examples of RF components of FIG. 2A-2C.

In an example configuration 150 of the architecture 100 of FIG. 2A, one additional throw can be provided for the input switch to yield an SP(N+1)T switch 152. Such an added throw can be dedicated for bypassing of a single-channel RF device 104. Such a single-channel RF device can have an input via a conductive path 112 and an output via a conductive path 114. Thus, when in a pass-through mode, an RF signal can pass from the switch 152 via one of the N throws, to the RF device 104 via the path 112, and be output from the RF device 104 via the path 114. When in a bypass mode, an RF signal can pass from the switch 152 via the added throw to a bypass path 120 to thereby bypass the RF device 104. FIG. 3A shows a configuration 200 where the single-channel RF device 104 can be, for example, an RF filter 204.

Figure 3B:
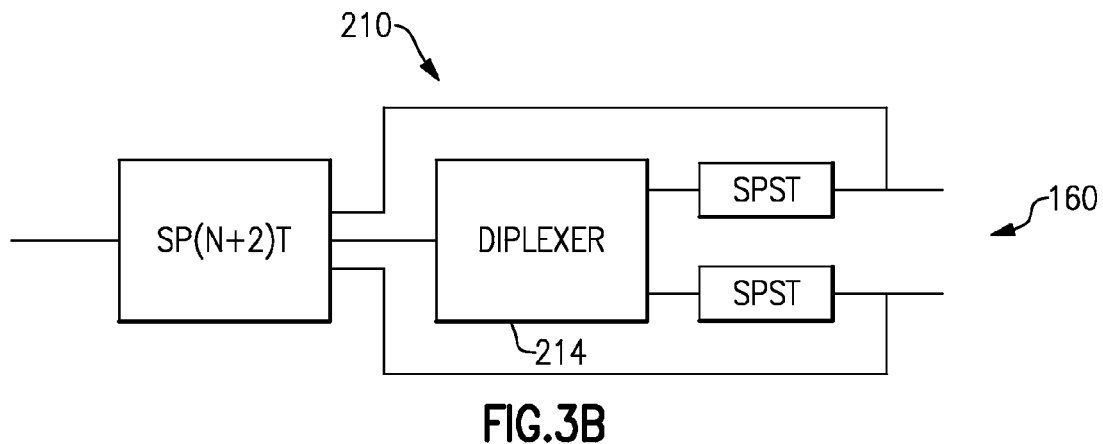

In an example configuration 160 of the architecture 100 of FIG. 2B, two additional throws can be provided for the input switch to yield an SP(N+2)T switch 162. Such added throws can be dedicated for bypassing of up to two channels of an RF device 104. Such a RF device can have an input via a conductive path 112 and two outputs via conductive paths 114a, 114b. Thus, when in a pass-through mode, an RF signal can pass from the switch 162 via one of the N throws, to the RF device 104 via the path 112, and be output from the RF device 104 via the paths 114a, 114b. When in a bypass mode, an RF signal can pass from the switch 162 via the two added throws to either or both of bypass paths 120a, 120b to thereby bypass the RF device 104. FIG. 3B shows an example configuration 210 where the RF device 104 can be, for example, a diplexer 214.

Figure 3C:
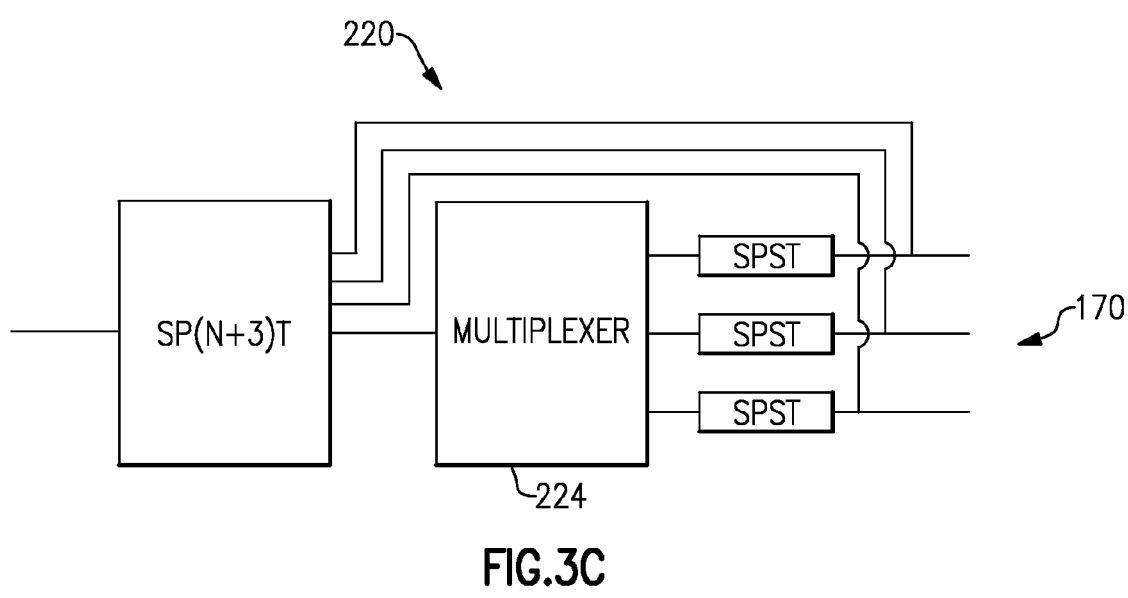

In an example configuration 170 of the architecture 100 of FIG. 2C, three additional throws can be provided for the input switch to yield an SP(N+3)T switch 172. Such added throws can be dedicated for bypassing of up to three channels of an RF device 104. Such a RF device can have an input via a conductive path 112 and three outputs via conductive paths 114a, 114b, 114c. Thus, when in a pass-through mode, an RF signal can pass from the switch 172 via one of the N throws, to the RF device 104 via the path 112, and be output from the RF device 104 via the paths 114a, 114b, 114c. When in a bypass mode, an RF signal can pass from the switch 172 via the three added throws to one or more of bypass paths 120a, 120b, 120c to thereby bypass the RF device 104. FIG. 3C shows an example configuration 220 where the RF device 104 can be, for example, a multiplexer 224.

FIGS. 2 and 3 show that in some implementations, one or more single-pole-single-throw (SPST) switches can provide functionalities associated with the second switch S2 (106) described in reference to FIG. 1. An SPST switch can be provided at an output of each channel of the RF device. Thus, in the example configuration 150 of FIG. 2A, an SPST switch 156 is shown to be provided at the single output of the RF device 104. In the example configuration 160 of FIG. 2B, SPST switches 156a, 156b are shown to be provided at the two outputs of the RF device 104. In the example configuration 170 of FIG. 2C, SPST switches 156a, 156b, 156c are shown to be provided at the three outputs of the RF device 104. Example operating configurations of the SPST switches 156 and the input switches (152, 162, 172) are described herein in greater detail.

Figure 4A:
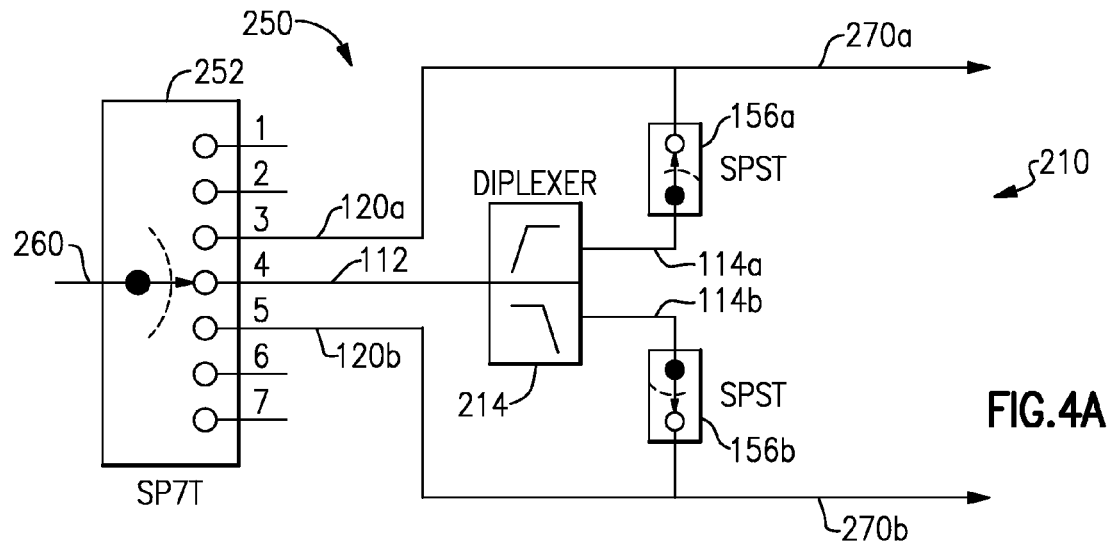
FIGS. 4A and 4B show pass-through and bypass modes of a more specific example of the configuration of FIG. 3B.
Figure 4B:
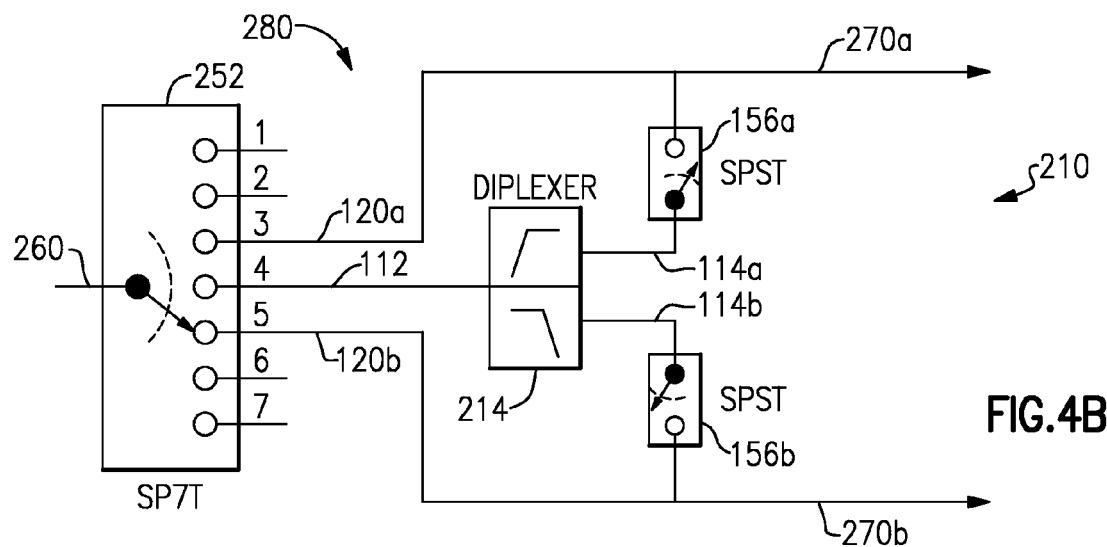

FIGS. 4A and 4B show pass-through (250) and bypass (280) modes of an example configuration 210 that can be a more specific example of the configuration described in reference to FIGS. 2B and 3B. The SP(N+2)T switch is shown to be an SP7T switch 252 configured to receive an input RF signal at its single pole via a conductive path 260. Five (1, 2, 4, 6, 7) of the seven throws are shown to provide regular switching network functionality for the switch 252, including providing a pass-through input for the diplexer 214 through the fourth throw and conductive path 112. The remaining two throws (3, 5) are shown to be connected to bypass paths 120a, 120b. The bypass paths 120a, 120b are shown to be connected to their respective output paths 270a, 270b.

The two output channels from the diplexer 214 are shown to be provided to conductive channel paths 114a, 114b. An SPST switch 156a is shown to be interposed between the first channel path 114a and the first output path 270a. Similarly, an SPST switch 156b is shown to be interposed between the second channel path 114b and the second output path 270b.

The example pass-through mode 250 of FIG. 4A can be implemented by setting the switch 252 so that the input pole is connected to the fourth throw, and closing each of the SPST switches 156a, 156b. Accordingly, the conductive path 260 is interconnected to both of the paths 270a, 270b to thereby facilitate the diplexer's operation.

The example bypass mode 280 of FIG. 4B can be implemented by setting the switch 252 so that the input pole is connected to the fifth throw, and opening each of the SPST switches 156a, 156b. Accordingly, the conductive path 260 is interconnected to the second paths 270b, and an RF signal between the two paths (260 and 270b) bypasses the diplexer 214. If the path 260 is to be interconnected to the first path 270a, the switch 252 can be set so that the input pole is connected to the third throw.

In either of the two foregoing bypassing examples, the SPST switch corresponding to the interconnected output is opened, and the other SPST switch may or may not be opened. For example, in the first example where the second path 270b is interconnected to the path 260, the second SPST switch 156b is opened, and the first SPST switch 156a may or may not be opened. Similarly, in the second example where the first path 270a is interconnected to the path 260, the first SPST switch 156a is opened, and the second SPST switch 156b may or may not be opened.

Figure 5:
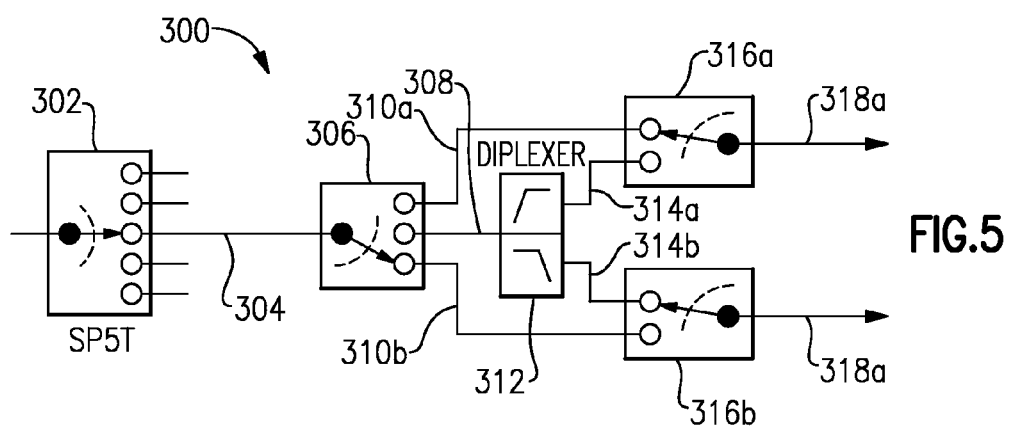
FIG. 5 shows an example of a current bypass architecture that requires a separate switch to effectuate the bypass functionality.

FIG. 5 shows an example configuration 300 of a current architecture for achieving a bypass of a diplexer 312 in the context of an example SP5T switch 302 that does not include any bypass-dedicated throw(s). The SP5T switch 302 is shown to have its third throw connected to a pathway 304 that provides an input for a separate bypass switch 306.

The separate bypass switch 306 is shown to include three throws, with the first and third throws connected to bypass paths 310a, 310b, and the second throw connected to an input 308 for the diplexer 312. Each of the diplexer's two outputs (314a, 314b) is shown to be connected to one of the two throws of an output switch (316a or 316b). The other throw of the output switch is shown to be connected to the bypass path (310a or 310b). The pole of the output switch is shown to be connected to an output path (318a or 318b).

Based on the comparison of the example architecture of FIG. 4 and the example current architecture of FIG. 5, a number of differences can be noted. For example, in the example architecture 210 of FIG. 4, an RF signal passes through two switches (SP7T and SPST) when in the pass-through mode, and only one switch (SP7T) when in the bypass mode. On the other hand, in the example architecture 300 of FIG. 5, an RF signal passes through three switches (SP5T, SP3T and SP2T) in both of the pass-through and bypass modes. Thus, one can see that the example architecture 210 of FIG. 4 advantageously has less number of separate switches where insertion losses can occur. Such an advantage can be even more pronounced in a bypass mode, where an RF signal can encounter only one switch (e.g., SP7T) as opposed to three switches (e.g., SP5T, SP3T and SP2T).

Figure 6:
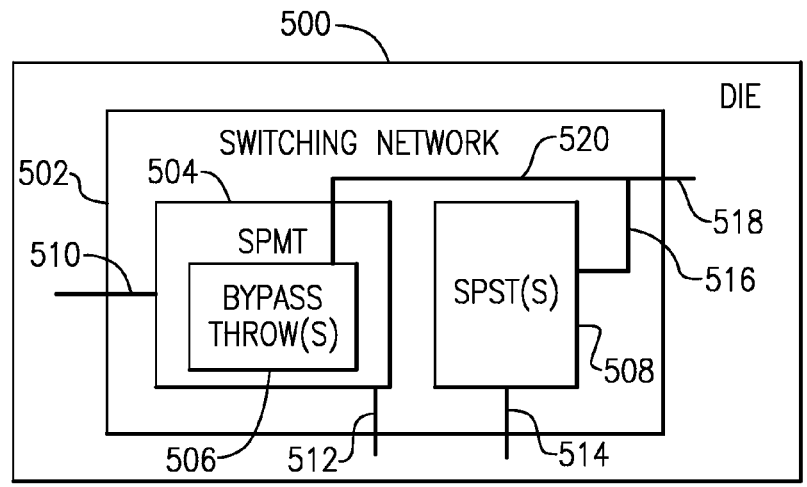
FIG. 6 shows an example semiconductor die having a switching network with one or more features described herein.

FIG. 6 shows that in some embodiments, a switching network 502 having one or more features as described herein can be implemented on a semiconductor die 500. Such a switching network can be fabricated using one or more process technologies. For example, a switching network can be based on a network of field-effect transistors (FETs) fabricated utilizing silicon-on-insulator (SOI) process technology. In another example, a switching network can be based on a network of pseudomorphic high-electron-mobility transistors (pHEMTs) implemented with gallium arsenide (GaAs) process technology. As described herein, the switching network 502 can include a single-pole-multiple-throw (SPMT) switch 504 that includes one or more bypass throws 506 dedicated for bypassing of signals away from an RF component (not shown). Such a dedicated throw is shown to be connected to a bypass path 520 which is in turn connected to an output path 518. The SPMT switch 504 is shown to be connected to a path for connecting to the RF device.

As also described herein, the switching network 502 can also include one or more SPST switches 508 to facilitate improved isolation when the switching network 502 is in a bypass mode. The SPST switch 508 is shown to be connected to a path 514 for connecting to an output of the RF device. The SPST switch 508 is also shown to be connected to a path 516 which is in turn connected to the output path 518. The paths 516 and 518 can be connected to the pole and throw of the SPST switch 508.

Figure 7:
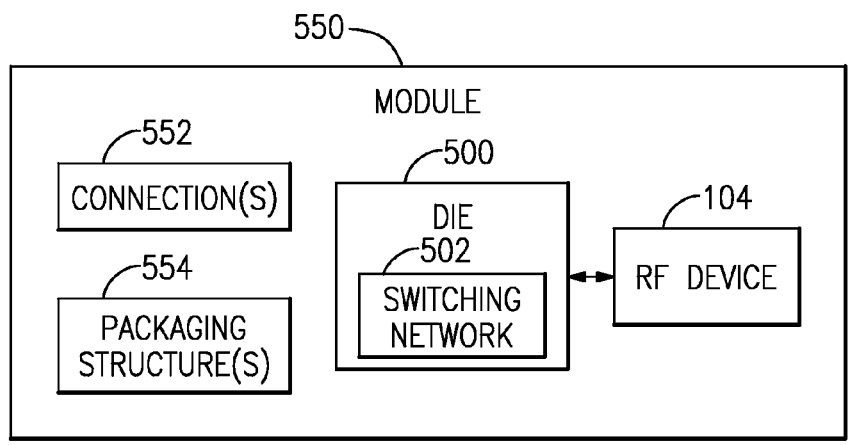
FIG. 7 shows an example module that can include the die of FIG. 6 and the RF component of FIGS. 1-3.

FIG. 7 shows that in some embodiments, a die 500 having a switching network 502 with one or more features as described herein can be part of a packaged module 550. The module 550 can also include an RF device 104 such as a filter, diplexer or multiplexer as described herein. The switching network 502 and the RF device 104 can be interconnected (e.g., by conductive paths 512 and 514 of FIG. 6) to provide functionalities described herein. The module 550 can also include one or more bypass paths to facilitate the bypassing functionality described herein. The module 550 can also include a packaging substrate such as a laminate substrate. The module 550 can also include one or more connections to facilitate providing of signals to and from the die 500. The module 550 can also include various packaging structures 554. For example, an overmold structure can be formed over the die 500 to provide protection from external elements.

Figure 8:
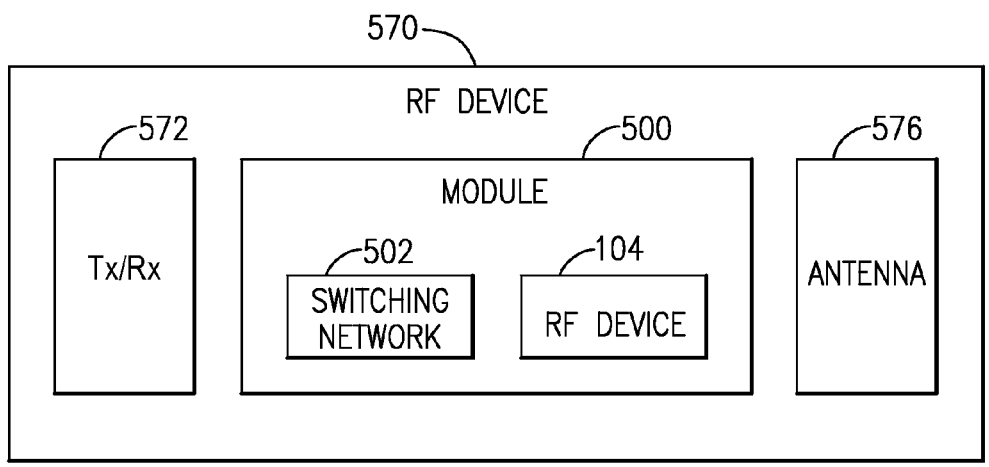
FIG. 8 shows an example RF device having a module that includes the switching network of FIG. 6.

FIG. 8 shows that in some embodiments, a module 500 having a switching network 502 and an RF device 104 described herein can be included in an RF device 570 such as a wireless device. Such a wireless device can include, for example, cellular phone, a smart phone, etc. In some embodiments, the switching network 502 can be implemented in a packaged module such as the example of FIG. 7. The RF device 570 is depicted as including other common components such a transceiver circuit 572 and an antenna 576.

FIG. 9 shows a process 600 that can be implemented to fabricate a device having a bypass architecture with one or more features as described herein. In block 602, a switch having at least one additional throw can be formed or provided. In block 604, an RF component such as a filter and/or a diplexer can be formed or provided. In block 606, at least one additional throw of the switch can be connected to at least one conduction path that bypasses the RF component. In some implementations, the conduction path can be connected to an output path. In some implementations, the process 600 can further include forming or providing an SPST switch between an output of the RF component and the output path.

FIGS. 10A and 10B show example processes that can be implemented to switch between pass-through and bypass modes as described herein. FIG. 10A shows a process 610 that can be implemented to enable the bypass mode. In block 612, a bypass command can be generated. In block 614, a switching signal can be issued. The switching signal can be based on the bypass command, and effectuate connection of a pole of a switch to a throw dedicated for bypassing of an RF signal.

FIG. 10B shows a process 620 that can be implemented to enable the pass-through mode. In block 622, a pass-through command can be generated. In block 624, a switching signal can be issued. The switching signal can be based on the pass-through command, and effectuate disconnection of a pole of a switch from a throw dedicated for bypassing of an RF signal.

Some examples herein are described in the context of a single-pole-multiple-throw (SPMT) providing an input for an RF component. For example, FIGS. 4A and 4B show paths where input is on the left side of the SP7T switch and outputs are on the right side of the architecture. It will be understood that such directionality is simply an example that facilitates the description. In some implementations, an architecture having one or more features described herein can be bi-directional. Such bi-directionality can apply to the architecture as a whole, or some portion thereof.

Some example switches are described herein in the context of a single-pole configuration. It will be understood, however, that one or more features of the present disclosure can also be implemented in switches having more than one pole.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:
1. A switching network circuitry comprising:
a first switch that includes an input pole configured to receive a radio-frequency (RF) signal, a pass-through throw connected to an RF component and configured to be connectable to the input pole to allow routing of the RF signal from the input pole to the RF component, and at least one bypass throw each connected to an output path and configured to be connectable to the input pole to allow routing of the RF signal from the input pole to the output path; and a second switch implemented between each of the at least one output path and a corresponding output of the RF component, the second switch configured to allow routing of the RF signal from the input pole to the output path through the RF component when in a first state, and to allow routing of the RF signal from the input pole to the output path while bypassing the RF component when in a second state.

2. The circuitry of claim 1 wherein each of the at least one second switch includes a single-pole-single-throw (SPST) switch.

3. The circuitry of claim 1 wherein RF signal is routed through the first switch and the second switch when the second switch is in the first state, and through only the first switch when the second switch is in the second state.

4. The circuitry of claim 3 wherein the second switch is in an open state when in the first state, and in a closed state when in the second state.

5. The circuitry of claim 1 wherein the first switch is a single-pole-multiple-throw (SPMT) switch such that the single pole is the input pole and the multiple throws include the pass-through throw and the at least one bypass throw.

6. The circuitry of claim 5 wherein the RF component includes a filter.

7. The circuitry of claim 5 wherein the at least one bypass throw includes two or more throws.

8. The circuitry of claim 7 wherein the RF component includes a diplexer.

9. A semiconductor die comprising:
a substrate configured to receive a plurality of components; and
a switching network disposed on the substrate, the switching network including a first switch having an input pole configured to receive a radio-frequency (RF) signal, a pass-through throw connected to an RF component and configured to be connectable to the input pole to allow routing of the RF signal from the input pole to the RF component, and at least one bypass throw each connected to an output path and configured to be connectable to the input pole to allow routing of the RF signal from the input pole to the output path, the switching network further including a second switch implemented between each of the at least one output path and a corresponding output of the RF component, the second switch configured to allow routing of the RF signal from the input pole to the output path through the RF component when in a first state, and to allow routing of the RF signal from the input pole to the output path while bypassing the RF component when in a second state.

10. The semiconductor die of claim 9 wherein the switching network is implemented as silicon-on-insulator (SOI) process technology.

11. The semiconductor die of claim 9 wherein the switching network is implemented as pseudomorphic high-electron-mobility transistor (pHEMT) process technology.

12. A method for fabricating a device having a bypass architecture, the method comprising:
forming or providing a first switch that includes a pass-through throw and at least one bypass throw for bypassing of a radio-frequency (RF) signal;
connecting the pass-through throw of the first switch to an RF component;
connecting each of the at least one bypass throw to a corresponding output path; and
forming or providing a second switch between each of the at least one output path and a corresponding output of the RF component, such that the RF signal is routed from the first switch to the output path through the RF component when the second switch is in a first state, and the RF signal is routed from the first switch to the output path while bypassing the RF component when the second switch is in a second state.

13. The method of claim 12 wherein the RF component includes a filter.

14. The method of claim 12 wherein the RF component includes a diplexer.

* * * * *